United States Patent [19]

Ceglio et al.

[11] Patent Number: 5,071,207
[45] Date of Patent: Dec. 10, 1991

[54] BROADBAND DIFFRACTIVE LENS OR IMAGING ELEMENT

[75] Inventors: Natale M. Ceglio, Livermore; Andrew M. Hawryluk, Modesto; Richard A. London, Oakland; Lynn G. Seppala, Livermore, all of Calif.

[73] Assignee: The United States of America as represented by the United States Department of Energy, Washington, D.C.

[21] Appl. No.: 587,699

[22] Filed: Sep. 25, 1990

[51] Int. Cl.$^5$ ............................................. G02B 27/44
[52] U.S. Cl. ................................... 359/15; 250/505.1; 351/160 R; 623/6; 359/565; 359/571; 359/558
[58] Field of Search ...................... 350/3.7, 3.72, 3.75, 350/3.77, 162.11, 162.16, 162.19, 162.22; 250/505.1; 351/167, 160 R, 168, 172, 161; 623/6

[56] References Cited

U.S. PATENT DOCUMENTS

| | | | |
|---|---|---|---|
| 3,309,162 | 3/1967 | Kosanke et al. | 350/162.16 |
| 3,402,001 | 9/1968 | Fleisher | 350/162.16 |
| 3,759,604 | 9/1973 | Thelen | 350/166 |
| 4,132,654 | 1/1979 | Braun | 378/145 |
| 4,637,697 | 1/1987 | Freeman | 350/162.16 |

Primary Examiner—Bruce Y. Arnold
Assistant Examiner—J. P. Ryan
Attorney, Agent, or Firm—Henry P. Sartorio; L. E. Carnahan; William R. Moser

[57] ABSTRACT

A broadband diffractive lens or imaging element produces a sharp focus and/or a high resolution image with broad bandwidth illuminating radiation. The diffractive lens is sectored or segmented into regions, each of which focuses or images a distinct narrowband of radiation but all of which have a common focal length. Alternatively, a serial stack of minus filters, each with a diffraction pattern which focuses or images a distinct narrowband of radiation but all of which have a common focal length, is used. The two approaches can be combined. Multifocal broadband diffractive elements can also be formed.

26 Claims, 8 Drawing Sheets

BROADBAND DIFFRACTIVE LENS OR IMAGING ELEMENT

The United States Government has rights in this invention pursuant to Contract No. W-7405-ENG-48 between the U.S. Department of Energy and the University of California, for the operation of Lawrence Livermore National Laboratory.

BACKGROUND OF THE INVENTION

This invention relates generally to diffractive imaging elements or lenses, including Fresnel zone plates, Fresnel phase plates, blazed Fresnel phase plates or other patterns which focus radiation primarily by diffraction, and more particularly to diffractive imaging elements having significantly reduced chromatic aberrations to produce a sharp focus and/or produce high quality images using much broader bandwidth radiation than is possible with conventional diffractive lenses.

Fresnel zone plates, Fresnel phase plates, and blazed Fresnel phase plates can be used to focus and/or image radiation. Blazed Fresnel phase plates are described in N. M. Ceglio and H. I. Smith, in "Proceedings VIII Int'l Conf. on X-Ray Optics and Microanalysis" (D. R. Beaman R. E. Ogilvie, and D. B. Wittry, Eds.), P. 255, Pendell, Midland, Mich., 1980. In addition, other diffractive optical elements (e.g., holograms or holographic optical components) can also be used to focus or image radiation. All these optical elements use primarily diffraction to achieve focus or image formation. Since diffractive power (e.g., focal length) is strongly wavelength dependent, all of these diffractive lens structures suffer from chromatic aberrations.

Fresnel diffractive structures (e.g., Fresnel zone plates, Fresnel phase plates, and blazed Fresnel phase plates) are divided into Fresnel zones where the radius of the nth zone is given by $$r^2_n = nr^2_1 + n^2\lambda^2/4 \quad (1)$$

where $r_1$ is the radius of the central zone and $\lambda$ is the wavelength of the radiation to be focused. Such a Fresnel zone structure may be viewed as a diffractive lens having a focal length, $$f = r_1^2/\lambda \quad (2)$$

The focal length of the lens is wavelength dependent; indeed, the geometrical pattern itself (i.e., placement of the $r_n$'s) is wavelength dependent. If a Fresnel structure designed to focus radiation at one wavelength, $\lambda_1$, is used with radiation at a different wavelength, $\lambda_2$, there will be a focal error or chromatic aberration (from equation (2)). The conventionally "acceptable" bandwidth for such a lens is generally taken as $$\Delta\lambda = 1/N \quad (3)$$

wherein N=total number of zones. Under the conditions of equation (3), the performance of the lens is virtually diffraction limited and the focal spot size approaches the width of the outermost zone, $$\Delta r = r_N - r_{N-1} \quad (4)$$

In practice, the acceptable bandwidth for illumination of the Fresnel structure will depend on the application, and will be determined by a trade-off between efficiency (i.e., accepting a broader bandwidth) and resolution loss (primarily due to chromatic aberrations).

Thus, diffractive lenses generally produce a sharp focus or a high resolution image only if illuminated with sufficiently narrowband ($\Delta\lambda \leq \lambda/N$) radiation. For these reasons, conventional diffractive imaging systems or lenses are generally viewed as narrowband imaging systems or imaging systems suffering from severe chromatic aberrations.

In many regions of the electromagnetic spectrum (and for other radiation such as neutrons, atoms, ions), refractive lenses are not practical so that diffractive lenses are all that are available to focus or image the radiation. This results either from severe absorption of the radiation in materials and/or because the refractive power of available materials is not sufficiently different from vacuum for those types of radiation. Under such circumstances, there is a great motivation for a scheme which would enable diffractive lenses to focus and/or image broadband radiation. Indeed, most sources of electromagnetic radiation in these spectral regions are broadband, for example, synchrotrons, plasmas, blackbody radiation, etc. Diffractive lenses also have properties which would make them very useful for application in parts of the electromagnetic spectrum where refractive optics already exist. For example, diffractive lenses have been easily implemented as bifocal and/or multifocal imaging and focusing elements. (Indeed, a bifocal or multifocal diffractive lens may simply be considered a hologram.) In addition, diffractive lenses can have high dioptric power and at the same time be very thin and easily deformable, making diffractive lenses attractive options for intra-ocular lenses and/or contact lenses. U.S. Pat. application Ser. No. 495,073 filed Mar. 19, 1990 describes microthin diffractive lenses for intraocular implants and corneal lenses. In these applications, it would be highly beneficial, and perhaps essential, that the diffractive lenses be able to focus and image broadband radiation and have significantly reduced chromatic aberrations.

There is, in addition, a great interest in x-ray optics in having relatively broadband imaging and focusing optics which can approach diffraction limited resolution. At soft x-ray wavelengths, Fresnel structures (zone plates and phase plates) have demonstrated diffraction limited resolution down to about 300A with narrowband ($\Delta\lambda < \lambda/N$) illumination. The best performance for broadband imaging has been achieved using grazing incidence reflection optics, and image resolutions of order $\gtrsim 1$ µm have been demonstrated. There are applications in x-ray microscopy, materials analysis, and x-ray matter interaction studies which could benefit from an ability to focus and/or image relatively broadband radiation with diffraction limited or near diffraction limited performance.

With such a strong motivation for broadband diffractive optics, there have been various attempts to design diffractive lens doublets or triplets to correct for and/or reduce the chromatic aberrations in diffractive optics. These approaches to chromatic aberration correction are less than satisfactory for at least two reasons: (1) They generally involve two or more diffractive elements separated by a finite distance. As such, they are really a "lens system" or an "optical system", not a simple, compact broadband lens. For many applications (e.g., contact lens or intra-ocular lens implants), the "system" approach is not practical. (2) In addition, diffractive optical elements typically operate at limited efficiency. For example, an ideal Fresnel zone plate diffracts only 10% of the incident (narrowband) radiation into its first order focus, and an ideal Fresnel phase plate (in the absence of radiation absorption) diffracts 40% of the incident narrowband radiation into its first order focus. [However, if the Fresnel phase structure is appropriately blazed (i.e., a blazed Fresnel phase plate) it can, in principle, direct 100% of the incident radiation into its focal spot.] Thus, an optical system for chromatic aberration correction that puts M such structures (each having efficiency $\gamma$) in series suffers in overall radiation transport efficiency by a factor of $(\gamma)^M$. For example, a triplet (M=3) of zone plate structures ($\gamma=0.1$) would have an overall efficiency of 0.001.

SUMMARY OF THE INVENTION

The invention is a Broadband Diffractive Lens (BBDL), which is produced by at least one of two approaches.

In one embodiment, the diffractive lens is divided into "segments or sectors", each having its own, individualized, narrowband ($\Delta\lambda$ where $\lambda$=wavelength of the radiation) filter which ideally would pass the radiation within bandwidth $\Delta\lambda$ and reject (i.e., not pass; e.g., absorb or reflect) the radiation outside that bandwidth. Each sector (or segment) would have its diffractive geometry configured or patterned (i.e., it would have a zone plate or phase plate or blazed phase plate pattern or other diffractive focusing pattern formed on the sector or segment) such that for its bandpass ($\Delta\lambda$) it would have a focal length f, and that focal length would be the same for (or not significantly different from) all the segments or sectors in the lens. In this way, a single lens made up of two or more sectors or segments could be illuminated with broadband radiation and produce a single broadband focus or broadband image. The invention includes all geometrical shapes for the segments or sectors making up the BBDL. For example, the individual segments or sectors could be annular, or they could be radial or pie shaped segments, or they could even be chosen to have randomly shaped boundaries.

In another embodiment, a "Serial Stack of Minus Filters" (SSMF) is used to make up the BBDL. An ideal "minus" filter has the property that it will pass all radiation not included in a narrow bandwidth $\Delta\lambda$, while radiation within bandwidth $\Delta\lambda$ will be rejected (e.g., absorbed or reflected) by the minus filter. The minus filter concept is expanded to include an idealized "phase" minus filter which has the property that radiation within bandwidth $\Delta\lambda$ undergoes a phase shift (which can be controlled to improve efficiency), whereas the radiation outside $\Delta\lambda$ is virtually unaffected by the phase minus filter.

In the second embodiment, each minus filter is geometrically configured or patterned (i.e., it would have a zone plate or phase plate or blazed phase plate pattern or other diffractive focusing pattern formed thereon) to produce a diffractive lens with a focal length f for radiation within its bandwidth $\Delta\lambda$. Each geometrically configured or patterned minus filter acts as a diffractive lens which focuses or images the radiation within its bandwidth ($\Delta\lambda$), but allows all out-of-bandwidth radiation to pass virtually unaffected. The Broadband Diffractive Lens (BBDL) is thereby made up by putting together a stack of such minus filters, in series, such that each filter modulates a complementary narrow bandwidth ($\Delta\lambda$), and is geometrically configured or patterned to produce the same (or insignificantly different) focal length as the other geometrically configured or patterned minus filters in the stack. Such a stack of ideal minus filters, with appropriate diffractive geometrical configurations, would thereby be able to focus or image broadband incident radiation.

In a combined embodiment, a combination of the first two may be utilized, i.e., sectors or segments with minus filters. The number of minus filters in the stack will be determined by the number of wavelength bands and the number of sectors or segments will be determined by the number of foci.

Although the description of the invention discusses ideal narrowband filters and ideal minus filters and ideal Fresnel zone diffractive geometries, it is also intended to cover all embodiments which incorporate non-ideal approximations to the proposed configurations and concepts.

The broadband diffractive lens according to the invention is indeed a compact lens, not a separated "optical system" and therefore does not suffer from the product of inefficiencies of its components. Even in the second approach, which uses the series of stacked minus filters (SSMFs), each minus filter in the stack modulates only the radiation within its design bandwidth and passes the other radiation virtually unaffected. In this way, the inefficiencies of the minus filters in the stack do not compound serially.

The Broadband Diffractive Lens will have application in many regions of the electromagnetic spectrum and can also be used in the focusing and imaging of non-electromagnetic radiation (e.g., in diffractive lenses for focusing low energy neutrons or atoms or ions). The BBDL can have application at optical wavelengths. It may be especially useful for contact lenses and/or intraocular lenses, since the diffractive lens can, in principle, be quite thin and easily deformable. The BBDL, because it is a diffractive lens can also provide bifocal and multifocal imaging capabilities.

The BBDL may be particularly useful at infrared, ultraviolet, deep ultraviolet, soft x-ray, and hard x-ray wavelengths where options for refractive lenses are limited. In such applications, diffractive lenses with broadband focusing and imaging capabilities will be a new and welcome optical component.

This invention is intended to include all, but not be restricted to, the above described applications of the BBDL.

BRIEF DESCRIPTION OF THE DRAWINGS

FIG. 1A shows a front view.

DETAILED DESCRIPTION OF THE INVENTION

This invention provides a broadband diffractive lens which is able to produce a sharp focus and/or a high resolution image using a significantly broader bandwidth of illuminating radiation than the conventionally acceptable narrow bandwidth for diffractive lenses. (The conventionally acceptable (narrow) bandwidth is defined as $\Delta\lambda = \lambda/N$, where $\Delta\lambda$ is the conventional (narrow) bandwidth of illumination for diffraction limited performance of a diffractive lens, $\lambda$ is the central wavelength within the band of radiation, and N is the number of Fresnel zones of the diffractive lens).

The invention provides for two approaches or a combination thereof to achieving a broadband diffractive lens: the diffractive lens is sectored or segmented into regions, each accommodating (i.e., focusing or imaging) a distinct narrowband of radiation, but all segments or sectors having a common focal length; and the diffractive lens is formed of a serial stack of minus filters (SSMF), each accommodating (i.e., focusing or imaging) a distinct narrowband of radiation while passing all other wavelengths, all filters having a common focal length.

Sectored or Segmented Diffractive Lens (SSDL)

Figure 1A:
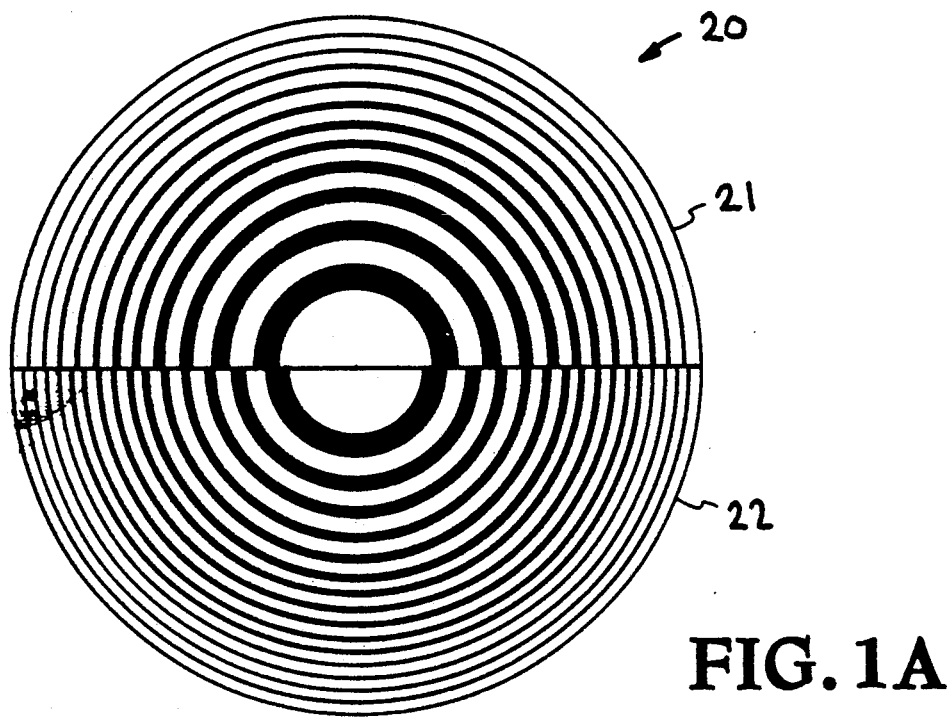
FIGS. 1A and B illustrate a sectored diffractive lens having a Fresnel zone structure divided into two sectors or segments.
Figure 1B:
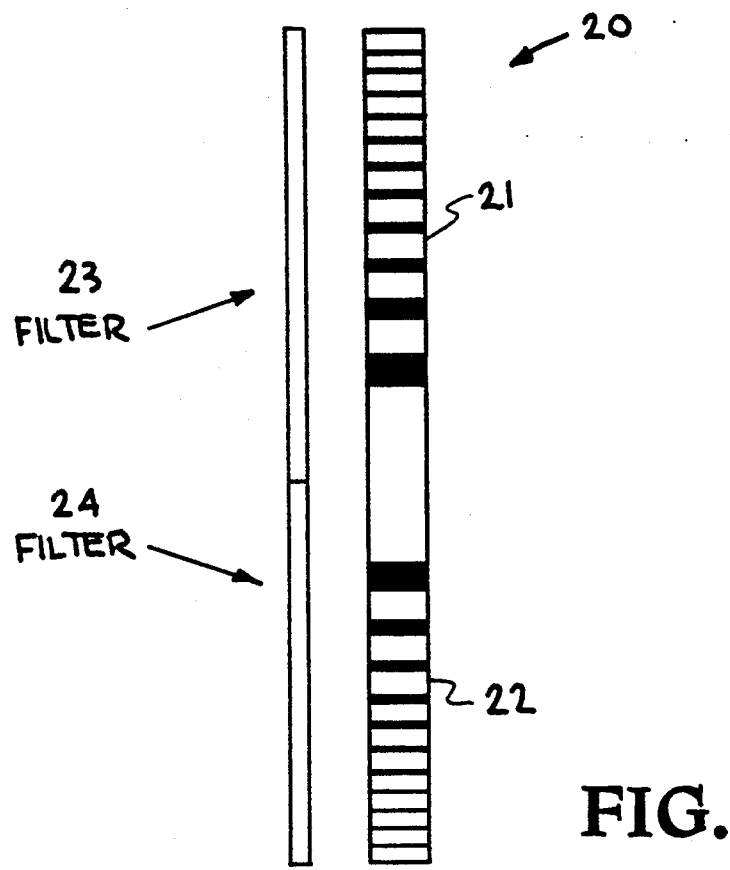
FIG. 1B shows a side view illustrating the filtration of the incident radiation.

A particular example of the SSDL is illustrated in FIGS. 1A and B. Shown is a Fresnel zone structure 20 divided into two segments 21, 22. In this example, the top segment 21 would have its Fresnel zone boundaries given by $$r_n^2 = n\lambda_T f + n^2\lambda_T^2/4$$

from equations (1) and (2). Similarly, the bottom segment 22 would have its Fresnel zone boundaries given by $$r_n^2 = n\lambda_B f + n^2\lambda_B^2/4$$

$\lambda_T$ and $\lambda_B$ are different wavelengths, but the focal lengths, f, of the two segments are the same. In addition, the radiation incident on the top segment 21 would be filtered by filter 23 to allow only a narrowband of radiation $\Delta\lambda_T$ centered about $\lambda_T$. Similarly, the radiation incident on the bottom segment would be filtered by filter 24 to allow only a narrowband of radiation $\Delta\lambda_B$ centered about $\lambda_B$. Although the filters are shown in a spaced relationship to the Fresnel structure, the spacing can be very small, or the filters may contact the Fresnel structure. Alternatively, in place of separate filters 23, 24 the filters may also be incorporated into the Fresnel structure itself, e.g., by using suitable dyes with the necessary absorption characteristics. In this way, the simple diffractive structure illustrated in FIGS. 1A, B could focus incident radiation of composite bandwidth $\Delta\lambda_T + \Delta\lambda_B$ to a single focal spot or it could produce a single broadband (i.e., $\Delta\lambda_T + \Delta\lambda_B$) image.

Figure 2:
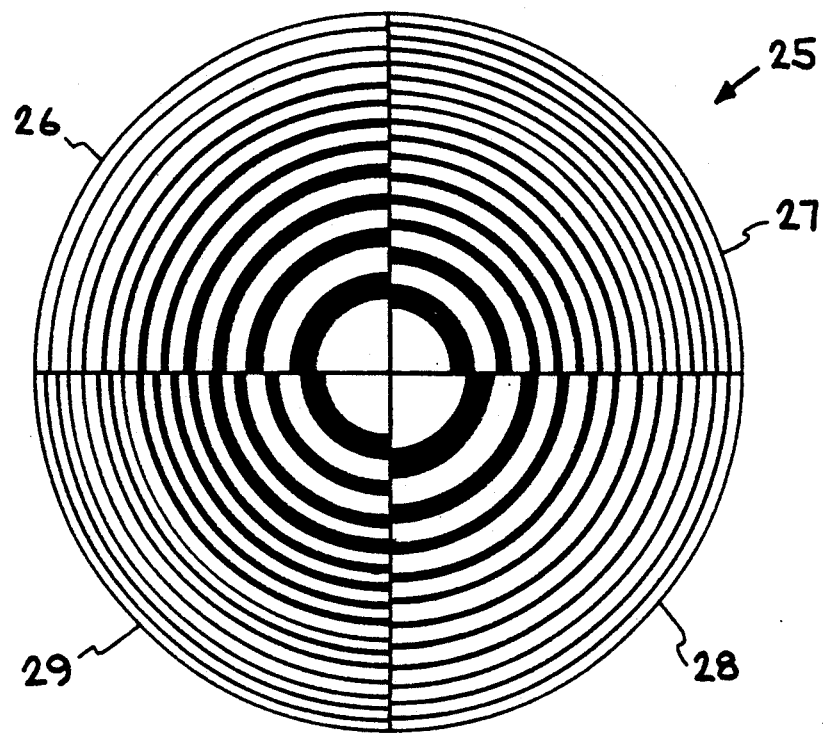
FIG. 2 illustrates a sectored diffractive structure divided into four quadrants which could accommodate four or fewer separate spectral bandwidths.
Figure 4:
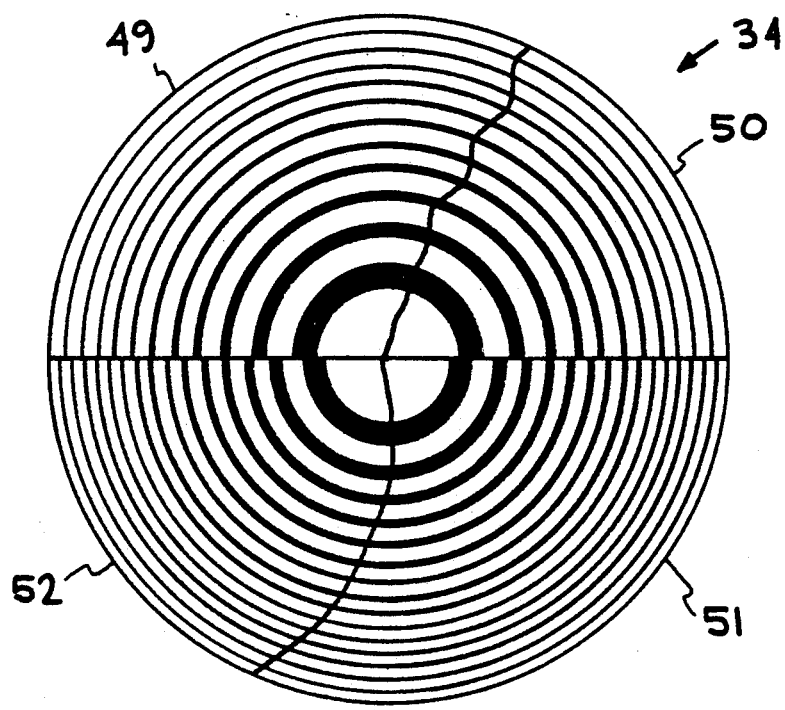
FIG. 4 illustrates a sectored diffractive structure divided into four irregularly shaped segments.
Figure 3:
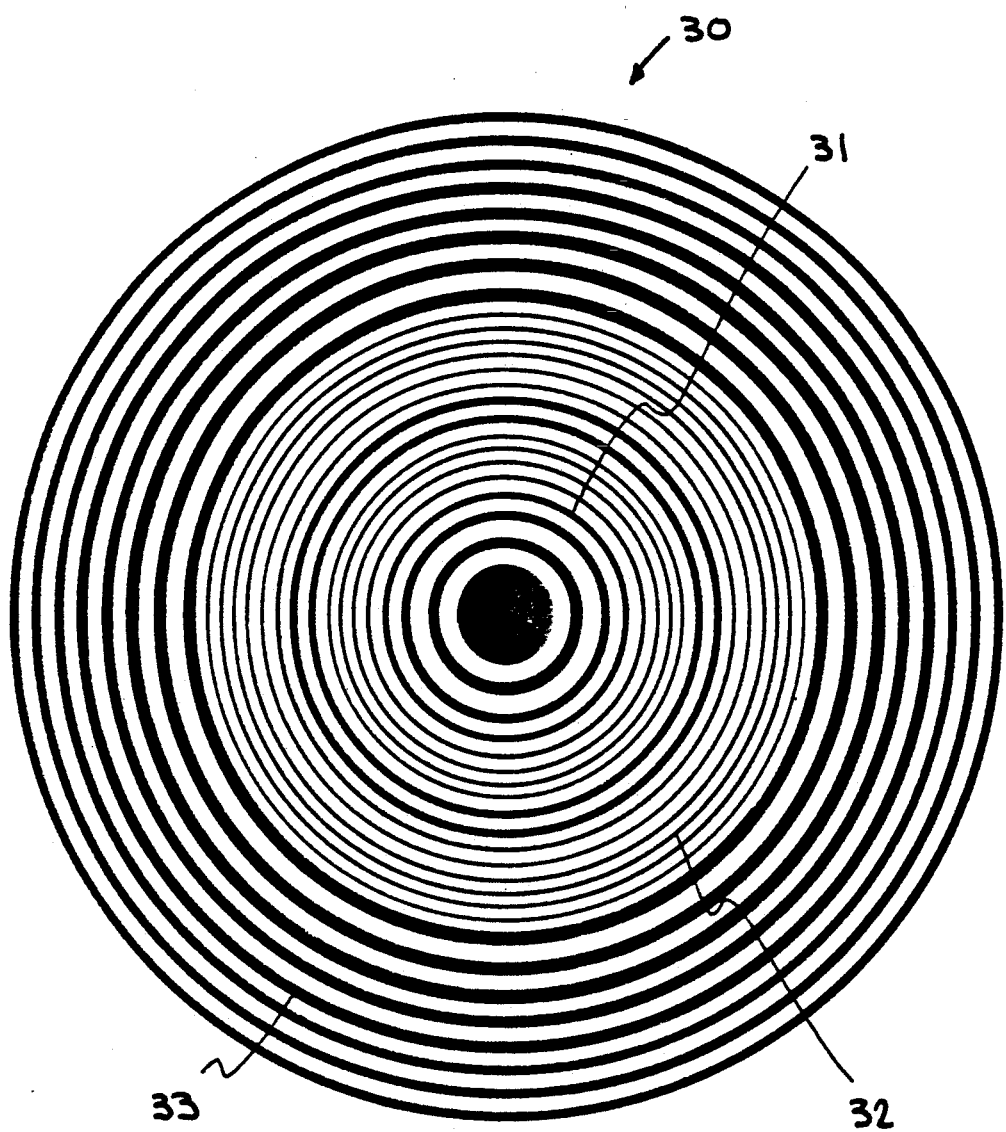
FIG. 3 illustrates a sectored diffractive structure divided into three circularly symmetric annular segments.

The invention also includes possible variations in the number of sectors (or segments) and variations in their shapes. For example, FIG. 2 shows a structure 25 divided into four quadrants 26, 27, 28, 29. These four quadrants can be geometrically configured and filtered to accommodate four separate bandwidths ($\Delta\lambda_1$, $\Delta\lambda_2$, $\Delta\lambda_3$, $\Delta\lambda_4$), all having a common focal length. However, for reasons of symmetry, it may be decided to use four quadrants to accommodate only two separate bandwidths (e.g., $\Delta\lambda_1$, $\Delta\lambda_2$, $\Delta\lambda_1$, $\Delta\lambda_2$ in the four quadrants respectively, i.e., sectors 26, 28 at one wavelength and sectors 27, 29 at the other). In general, the invention is intended to include expansion and variation of the sectored diffractive lens concept to include as much of the electromagnetic spectrum as is desired (e.g., by increasing the number of sectors), and/or to control the "color" balance in the broadband images by controlling the size of individual sectors and/or controlling the transmission through the filters used on specific sectors or segments. FIG. 3 provides an additional example of a sectored or segmented lens with differently shaped sectors. Shown in FIG. 3 is a diffractive structure 30 divided into three annular segments 31, 32, 33, i.e., circularly symmetric segments confined within radial bands. As with the Pie-shaped sectors, the incident radiation within each annular radial band would be filtered to pass only a narrowband, $\Delta\lambda$, centered about a wavelength, $\lambda_o$, and the Fresnel zones within that radial band would satisfy the equation $$r_n^2 = n\lambda_o f + n^2\lambda_o^2/4 \text{ for}$$

$$r_x \leq r_n \leq r_y$$

where $r_x$, $r_y$ are the radial boundaries of the annular segment. The other annular segments would accommodate different bandwidths of radiation, but, as before, all would have a common focal length. FIG. 4 illustrates another example of a sectored lens with differently shaped sectors. Diffractive structure 34 is divided into four irregularly shaped segments 49, 50, 51, 52.

Broadband Diffractive Lens Using a Serial Stack of Minus Filters

Figure 5A:
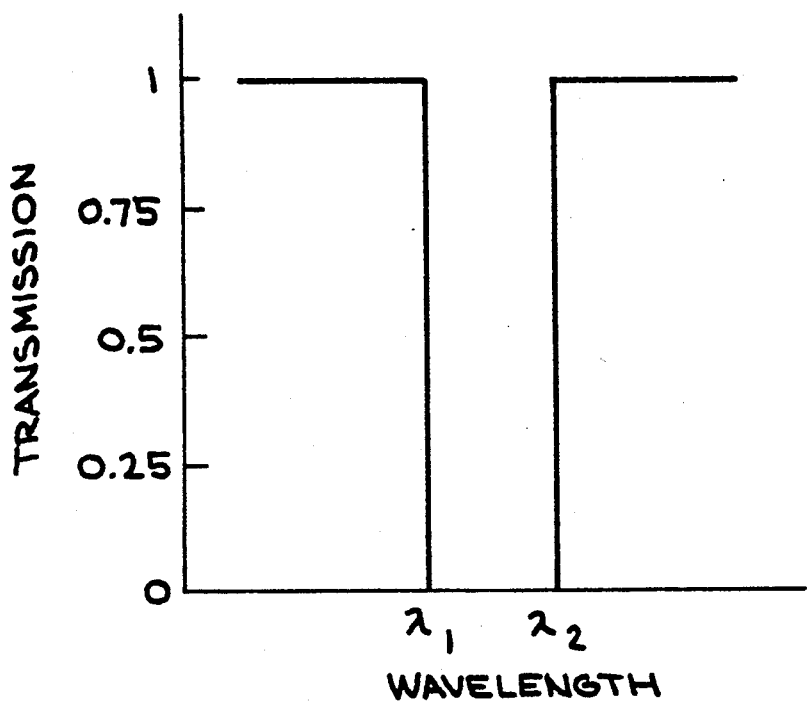
FIG. 5A illustrates the transmission versus wavelength curve of an idealized minus filter, which modulates the amplitude of incident radiation only within a narrow bandwidth, $\Delta\lambda$, and passes all out-of-bandwidth radiation virtually unaffected.
Figure 5B:
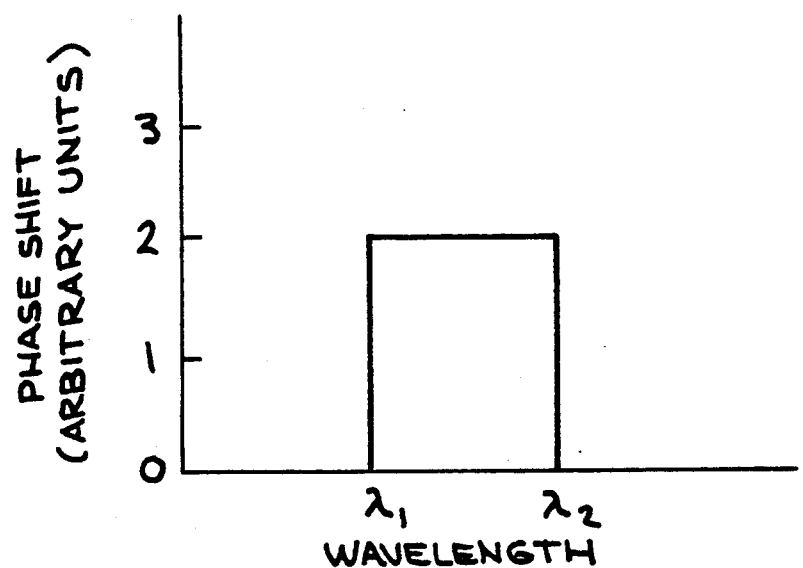
FIG. 5B illustrates the phase shift versus wavelength curve of an idealized "phase-minus" or "phase-notch" filter, which modulates only the phase of incident radiation and does so only within a narrow bandwidth, $\Delta\lambda$, passing all out-of-bandwidth radiation virtually unaffected.

This particular embodiment of the broadband diffractive lens utilizes the minus filter. The minus filter is described in Alfred Thelen, *Design of Optical Interference Coatings*, Ch. 7, pp. 147–155, McGraw Hill (1989). FIG. 5A illustrates the effect of an idealized minus filter. The filter absorbs radiation only within a narrow band, $\Delta\lambda = \lambda_2 - \lambda_1$, and passes all other radiation unaffected. An idealized "phase minus" or "phase-notch" filter, shown in FIG. 5B, provides a phase shift for radiation within a bandwidth $\Delta\lambda = \lambda_2 - \lambda_1$, but passes all other radiation unaffected. In accordance with the invention, a minus filter or phase minus filter (as illustrated in FIGS. 5A and B respectively) operating on a narrow band of radiation $\Delta\lambda_1$, centered at wavelength $\lambda_1$, when patterned with a Fresnel structure having Fresnel zones placed at $r_n$, such that $$r_n^2 = n\lambda_1 f + n^2\lambda_1^2/4$$

will focus the incident $\Delta\lambda_1$ to a virtually diffraction limited spot (for $\Delta\lambda_1 < \lambda_1/N$) with a focal length f, and will pass the radiation outside bandwidth $\Delta\lambda_1$ virtually unaffected. A second minus or phase minus filter placed in series with the first, but operating on a separate narrow bandwidth $\Delta\lambda_2$ centered at $\lambda_2$ and patterned with a Fresnel structure having Fresnel zones placed at $r_n$ such that $$r_n^2 = n\lambda_2 f + n^2\lambda_2^2/4$$

will serve to focus the incident $\Delta\lambda_2$ band to the same focal spot and pass the "out of bandwidth" radiation virtually unaffected. Thus, a serial stack of such appropriately chosen minus or phase minus filters with appropriately patterned Fresnel structures produces a single broadband focus of the incident radiation. Such a diffractive lens would have a single focal length for the broadband of incident radiation, and, as such, could produce high resolution images of broadband sources of radiation.

Figure 6:
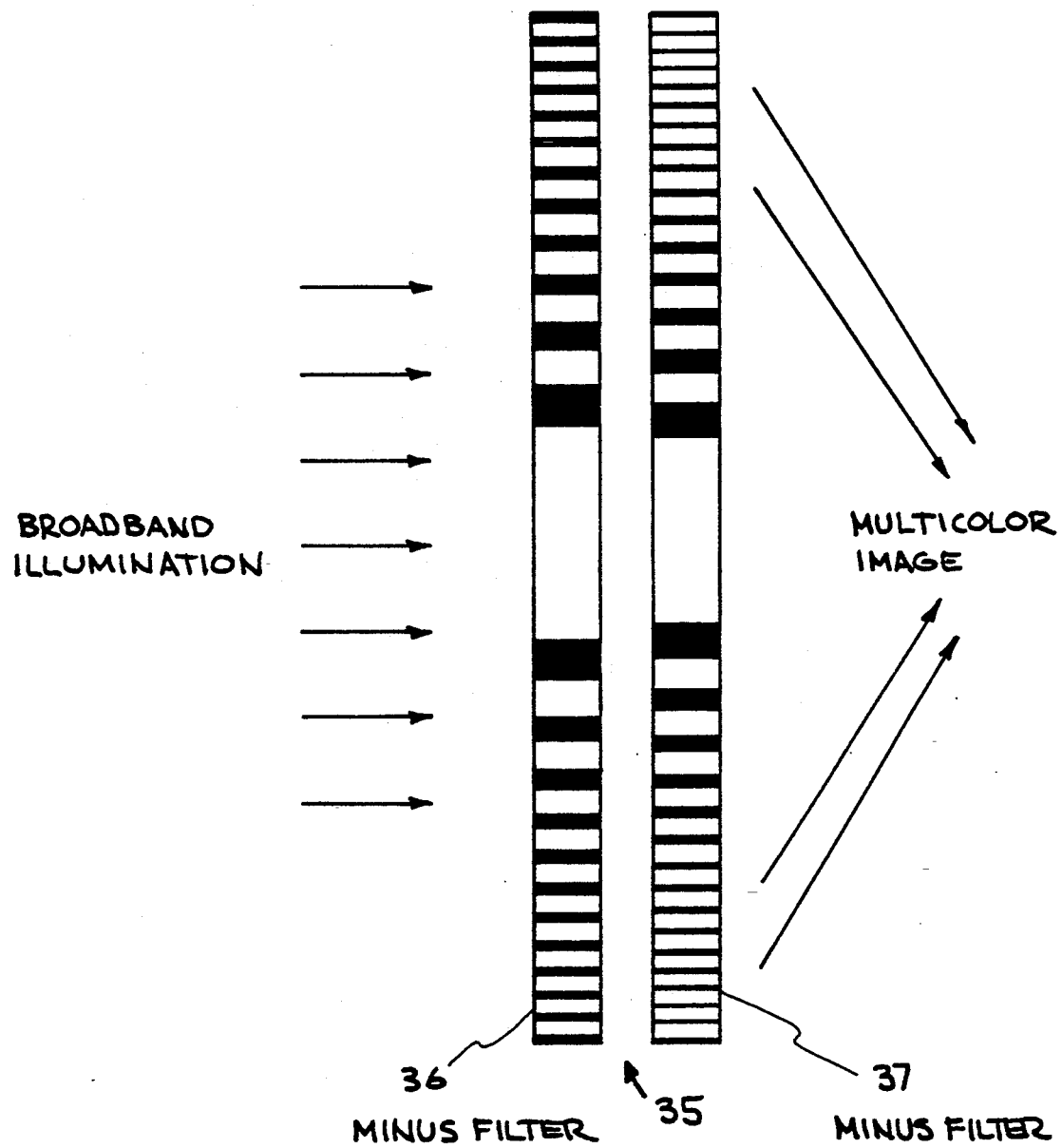
FIG. 6 illustrates a broadband diffractive lens made up of a serial stack of two minus filters patterned to provide a common focus.

An illustration of a serial stack 35 of two minus filters 36, 37 patterned to provide a common focus for two separate bands of radiation is shown in FIG. 6. The first minus filter 36 focuses or images a first band $\Delta\lambda_1$ centered at $\lambda_1$ while passing a second band $\Delta\lambda_2$ centered at $\lambda_2$ unaffected. The second band is focused or imaged by second minus filter 37 which passes the first band unaffected. Thus, stack 35 focusses or images the combined band $\Delta\lambda_1 + \Delta\lambda_2$ at a common focus or image plane. Although minus filters 36, 37 are shown in a spaced relationship, the spacing can be very small or the filters can contact each other.

The invention also includes broadband diffractive lenses made up of serial stacks which include non-ideal approximations to the minus filters and phase minus filters discussed herein.

The invention also includes the options of patterning the minus filter stack with Fresnel zone plate patterns (i.e., alternately transparent and opaque Fresnel zones), with Fresnel phase plate patterns (i.e., providing a phase shift difference of $\pi$ between adjacent Fresnel zones), with blazed Fresnel phase plate patterns (i.e., Fresnel structures wherein the phase of the incident wave is adjusted continuously from 0 to $2\pi$ over each adjacent pair of Fresnel zones), with generalized holographic diffractive patterns, or with any approximation to the above-cited diffractive patterns.

Broadband Multifocal Diffractive Lens

Figure 7:
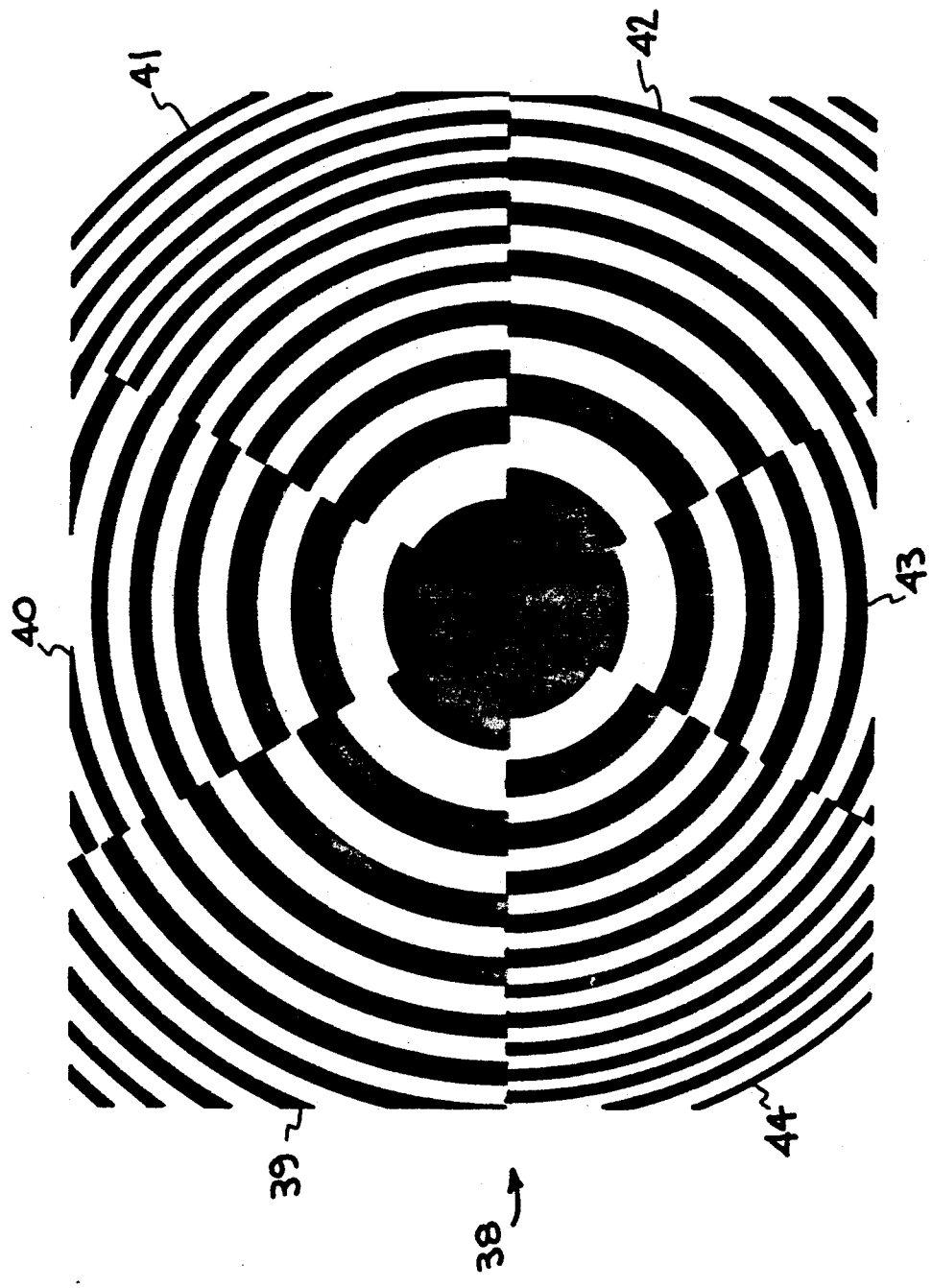
FIG. 7 illustrates a bifocal, broad band diffractive lens made up of six sectors. The lens focuses three bands of radiation to each of two foci and is intended for bifocal applications.

It is also intended as part of this invention to include the application of the above-described Broadband Diffractive Lens to bifocal and multifocal diffractive lens schemes, e.g., intra-ocular or corneal lenses as described in U.S. Pat. application Ser. No. 495,073 filed Mar. 19, 1990. For example, FIG. 7 shows a bifocal, sectored diffractive lens 38. In this case, the lens is divided into six sectors, 39, 40, 41, 42, 43, 44. The top three sectors 29, 40, 41 are filtered and configured for a single focal length, $f_1$, for three bands of radiation (e.g., a narrowband in the red $\Delta\lambda_R$, in the green $\Delta\lambda_G$, and in the blue $\Delta\lambda_B$). The bottom three sectors 42, 43, 44 are filtered and configured for a different focal length, $f_2$, for the same three bands of radiation ($\Delta\lambda_R$, $\Delta\lambda_G$, $\Delta\lambda_B$). In this way, a bifocal Broadband Diffractive Lens can be made. In similar fashion, the invention can be extended to produce multifocal (i.e., three or more foci) broadband diffractive lenses. It is also intended, as part of this invention, that by simple extension of these concepts, bifocal and multifocal diffractive lenses with "designer" (i.e., specifically designed or custom designed) bandwidths can be constructed. For example, it is intended to include the possibility of applications which have a specific bandwidth (e.g. $\Delta\lambda_R$, $\Delta\lambda_G$, $\Delta\lambda_B$) for focal length $f_1$, but a very different or slightly different bandwidth for focal length $f_2$, etc. Such a capability could be quite useful for applications in which the radiation coming from a distance (e.g., need longer focal length) has a spectrum quite different from the radiation coming from nearby sources (e.g., need shorter focal length). In this application, a bifocal broadband diffractive lens with different bandwidths (suited to the spectra of the different sources) for the different foci could be quite useful.

Figure 8:
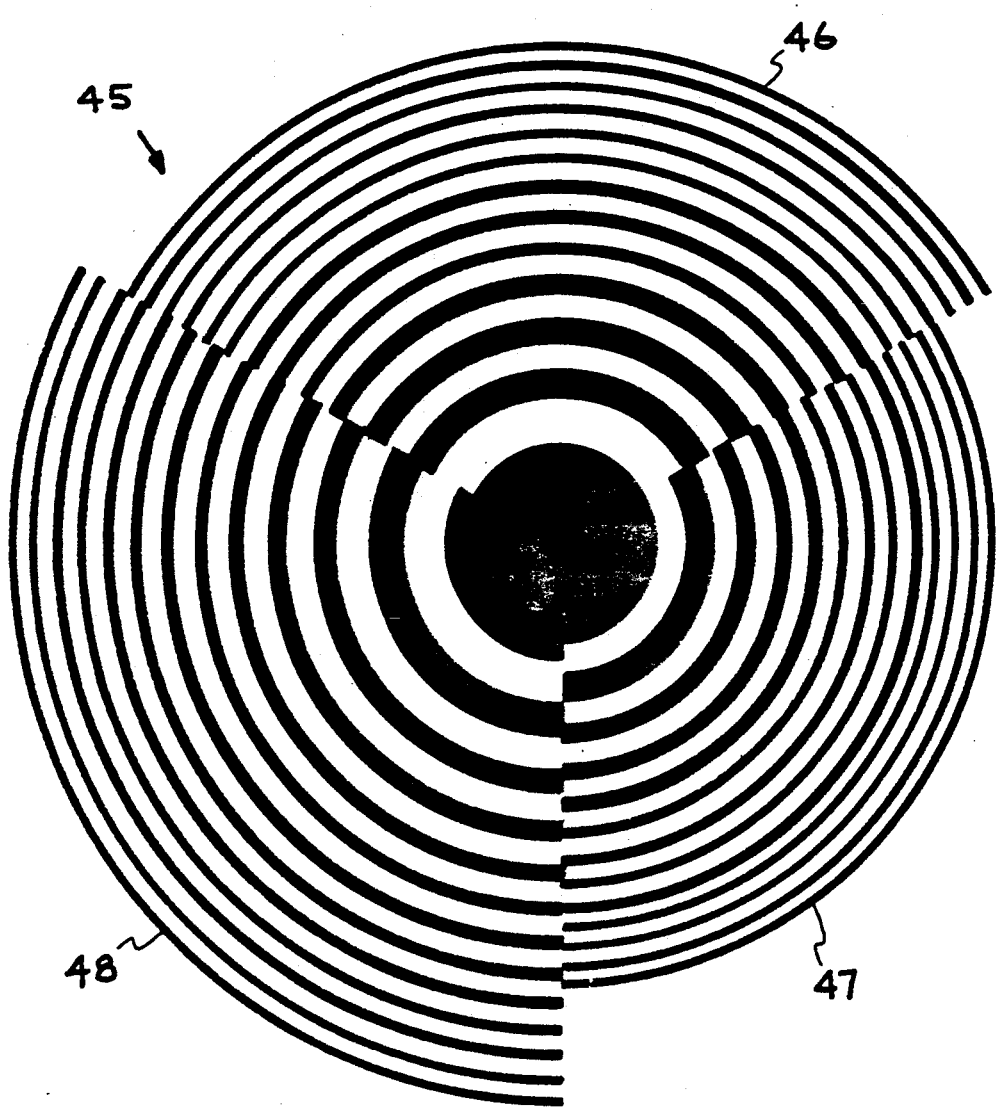
FIG. 8 illustrates a front view of a composite broadband diffractive lens in which a serial stack of minus filters is divided into three sectors producing a tri-focal lens with each focus having an identical, broadband of radiation concentrated at its focal point. The diameters of the three focal segments are shown as different, but, in general, they need not be.

It is also intended, as part of this invention, to include broadband diffractive lenses which are a combination or composite of both approaches, for example, a serial stack of minus filters which are sectored. In such a lens the need for filtering the sectors is obviated by the presence of the serial stack of minus filters. Such a composite broadband diffractive lens could serve ideally as a bifocal or multifocal broadband diffractive lens. For example, FIG. 8 shows a sectored minus filter 45 having three sectors 46, 47, 48. A plurality of sectored minus filters 45 can be stacked, similar to the stack arrangement shown in FIG. 6. For example, four minus filters 45 each having three sectors 46, 47, 48, can be stacked. The four minus filters provide for four different wavelength bands ($\Delta\lambda_1$, $\Delta\lambda_2$, $\Delta\lambda_3$, $\Delta\lambda_4$); thus the number of bands determines the number of minus filters in the stack. The number of segments in each minus filter determines the number of foci. For example, the four minus filter sectors in position 46 all have one focus, while the four minus filter sectors in position 47 have a second focus and the four in position 48 have a third focus. The minus filter stacks in each of the sectors can be the same (though they need not be) so that each of the three sectors will focus the same broad bandwidth of radiation. However, the diffractive patterning in the three sectors is different so that the lens will be tri-focal. As shown, the diameters of the three focal segments 46, 47, 48 are different, but, in general, they can be the same.

DESCRIPTION OF THE PREFERRED EMBODIMENTS

The invention is a lens or imaging element which achieves focusing and/or imaging primarily by diffraction and is capable of focusing and/or imaging radiation of a bandwidth much broader than conventional diffractive lenses or imaging elements using the above described principles. The invention includes, but is not limited to, the following specific embodiments.

Embodiment 1

A sectored or segmented diffractive lens is made of a number of sectors, as few as 2 or as many as 20 or more, in which the individual sectors have narrowband filters and the diffractive patterns in the individual sectors are Fresnel zone plate patterns (i.e., amplitude modulated zones). The shapes of the sectors or segments can be chosen to meet the needs of applications. The sectors or segments can be annular rings, pie shaped sectors, or even randomly shaped segments.

Embodiment 2

The same as Embodiment 1 except that the diffractive patterns in the individual sections are Fresnel phase plate patterns (i.e., phase modulated zones).

Embodiment 3

Figure 9:
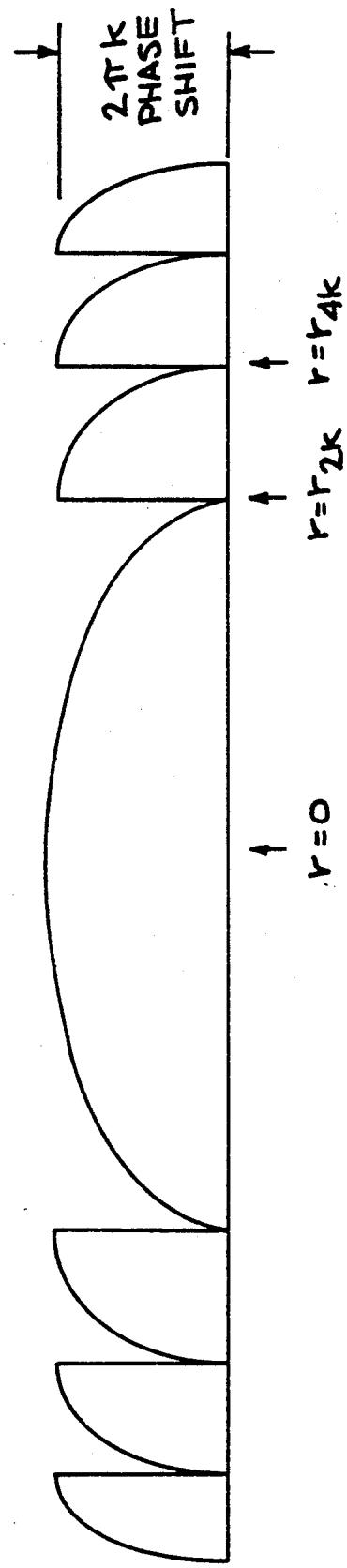
FIG. 9 illustrates the design of a blazed Fresnel phase plate of modulo k.

The same as Embodiment 1 except that the diffractive patterns in the individual sectors are blazed Fresnel phase plates of modulo k (where k is an integer), i.e., where the phase shift through the pattern is varied continuously from 0 to $2\pi k$ over $2k$ adjacent Fresnel zones as shown in FIG. 9.

Embodiment 4

Figure 10:
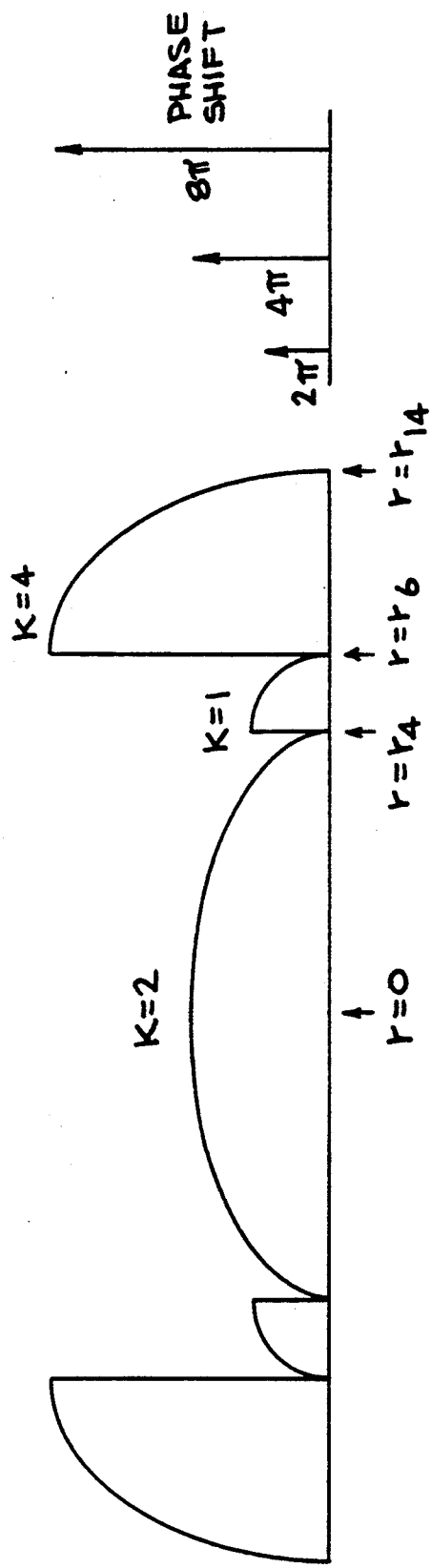
FIG. 10 illustrates the design of a blazed Fresnel phase plate of radially variable modulo.

The same as Embodiment 3 except that the diffractive patterns in the individual sectors are blazed Fresnel phase plates for which the integer modulo (k) may be varied throughout the radial distribution. For example, FIG. 10 shows a BFPP such that over zones 1 through 4 the phase shift provided by the pattern varies continuously from 0 to $4\pi$ (i.e., modulo 2), but over zones 5 and 6 the phase shift is varied continuously from 0 to $2\pi$ (i.e., modulo 1), whereas over zones 7 through 14 the phase shift is varied continuously from 0 to $8\pi$ (i.e., modulo 4), etc.

Embodiment 5

The same as Embodiment 1 except that the diffractive pattern in the individual sectors can be any generalized holographic focusing pattern of the amplitude modulation or phase modulation type.

Embodiment 6

All the options of Embodiments 1 thru 5 are extended to produce bifocal or multifocal broadband diffractive lenses or imaging elements as described above.

Embodiment 7

A broadband diffractive lens or imaging element is made up of a serial stack of minus filters, and the diffractive pattern is a Fresnel zone plate (i.e., amplitude modulated) or any amplitude modulated holographic focusing or imaging element.

Embodiment 8

The same as Embodiment 7 except that the broadband diffractive lens or imaging element is made up of serial stack of "phase-minus" filters, as described above, and the diffractive pattern is a Fresnel phase plate or blazed Fresnel phase plate (of modulo k, as in Embodiment 3, or of variable modulo as in Embodiment 4), or any phase modulated holographic focusing or imaging element.

Embodiment 9

A composite broadband diffractive lens or imaging element made up of a sectored stack of minus filters or phase-minus filters, and which can be used for monofocal or multi-focal imaging.

Embodiment 10

Includes Embodiments 1 through 9 in which approximations to idealized minus filters, or phase-minus filters, or idealized diffractive patterns are used.

Embodiment 11

Includes Embodiments 1 through 10 for application in any region(s) of the electromagnetic spectrum and for focusing or imaging other particles or radiation, such as neutrons, electrons, ions, atoms, etc

EXAMPLES

Example 1 is an example of Embodiment 3. A lens that can image radiation over a bandwidth from 500 to 560 nm with about a 1 cm focal length and a spatial resolution less than 20 microns (which is not diffraction limited) is formed of a three sector blazed Fresnel phase plate. Each of three sectors is designed to focus a 20 nm bandwidth of radiation. The first sector should have the following characteristics:

$r_1 = 71.41$ microns
$N = 50$
Diameter $> 1$ mm
$\Delta r_{min} \approx 5$ microns
filter: transmits from 500 to 520 nm $$f = \frac{r_1^2}{\lambda_1} \approx 1 \text{ cm}$$

$$r_n^2 = nr_1^2 + n^2\lambda_1^2/4 \quad n = 1, \ldots N$$

where $\lambda_1 = 510$ nm

The second sector should have the following characteristics:

$r_1 = 72.8$ microns
$N = 49$
Diameter $> 1$ mm
$r_{min} \approx 5.2$ microns
filter: transmits from 520 to 540 nm $$f = \frac{r_1^2}{\lambda_2} \approx 1 \text{ cm}$$

where $\lambda_2 = 530$ nm

The third sector should have the following characteristics:

$r_1 = 74.16$ microns
$N = 47$
Diameter $> 1$ mm
$\Delta r_{min} \approx 5.4$ microns
filter: transmits from 540 to 560 nm $$f = \frac{r_1^2}{\lambda_3} \approx 1 \text{ cm}$$

where $\lambda_3 = 550$ nm

The first sector is designed to operate at 510 nm, and focuses the radiation from 500 to 520 nm. The second sector is designed to operate at 530 nm and focuses the radiation from 520 to 540 nm. The third sector is designed to operate at 550 nm and focuses the radiation from 540 to 560 nm.

Example 2 is an example of Embodiment 7. A lens with similar performance to Example 1 can be fabricated using minus filters. Three minus filters are patterned with Fresnel zone plate patterns. The first patterned minus filter has the following characteristics:

$r_1 = 71.41$ microns
$N = 50$
Diameter $\geq 1$ mm
$\Delta r_{min} \approx 5$ microns $$r_n^2 = nr_1^2 + n^2\lambda_1^2/4 \quad n = 1, \ldots N$$

$$f = \frac{r_1^2}{\lambda_1} \approx 1 \text{ cm}$$

where $\lambda_1 = 510$ nm

The first minus filter rejects radiation in the band from 500 to 520 nm and passes all out-of-bandwidth radiation. The second patterned minus filter for this lens design has the following characteristics:

$r_1 = 72.8$ microns
$N = 49$
Diameter $> 1$ mm
$\Delta r_{min} \approx 5.2$ microns $$f = \frac{r_1^2}{\lambda_2} \approx 1 \text{ cm}$$

where $\lambda_2 = 530$ nm

This minus filter rejects radiation in the band from 520 to 540 nm.

The third patterned minus filter for this lens design has the following characteristics:

$r_1 = 74.16$ microns
$N = 47$
Diameter $> 1$ mm
$\Delta r_{min} \approx 5.4$ microns $$f = \frac{r_1^2}{\lambda_3} \approx 1 \text{ cm}$$

where $\lambda_3 = 550$ nm

The minus filter rejects radiation in the band from 540 to 560 nm.

The first minus filter is designed to operate at 510 nm, and focuses the radiation from 500 to 520 nm. The second minus filter is designed to operate at 530 nm and focuses the radiation from 520 to 540 nm. The third minus filter is designed to operate at 550 nm and focuses the radiation from 540 to 560 nm. Thus the bands that are "rejected" by each minus filter are focused or imaged by the diffractive pattern on the corresponding minus filter and pass through all the other minus filters without other effect, so that all the bands are focused or imaged to the same point or plane.

Changes and modifications in the specifically described embodiments can be carried out without departing from the scope of the invention which is intended to be limited only by the scope of the appended claims.

We claim:

1. A broadband diffractive lens or imaging element, comprising a diffractive element having a plurality of sectors or segments, each sector or segment having a diffractive geometry patterned thereon for focusing or imaging a different narrowband of radiation, all sectors or segments having substantially the same primary focal length.

2. The broadband diffractive lens or imaging element of claim 1 wherein the diffractive element is a Fresnel diffractive structure.

3. The broadband diffractive lens or imaging element of claim 2 wherein the diffractive element is selected from Fresnel zone plates, Fresnel phase plates, and blazed Fresnel phase plates.

4. The broadband diffractive lens or imaging element of claim 1 wherein the diffractive element is an amplitude modulation type diffractive element.

5. The broadband diffractive lens or imaging element of claim 1 wherein the diffractive element is a phase modulation type diffractive element.

6. The broadband diffractive lens or imaging element of claim 1 wherein the diffractive element is a holographic focusing or imaging pattern.

7. The broadband diffractive lens or imaging element of claim 1 further comprising a corresponding narrowband filter optically aligned with each sector or 8. The broadband diffractive lens or imaging element of claim 1 wherein the sectors or segments are radial pie-shaped segments.

9. The broadband diffractive lens or imaging element of claim 1 wherein the sectors or segments are annular segments.

10. The broadband diffractive lens or imaging element of claim 1 wherein the sectors or segments have randomly shaped boundaries.

11. The broadband diffractive lens or imaging element of claim 1 wherein the diffractive element is an intra-ocular or corneal lens.

12. The broadband diffractive lens or imaging element of claim 1 wherein the diffractive element is an element which focuses or images non-electromagnetic radiation selected from neutrons, electrons, atoms and 13. The broadband diffractive lens or imaging element of claim 1 wherein the diffractive element is an element which focuses or images electromagnetic radiation selected from infrared, ultraviolet, deep ultraviolet, soft x-ray and hard x-ray wavelengths.

14. The broadband diffractive lens or imaging element of claim 1 further comprising a second plurality of sectors or segments, each having a diffractive geometry patterned thereon for focusing or imaging a different narrowband of radiation, all sectors or segments of the second plurality having substantially the same primary focal length which differs from the focal length of the first plurality.

15. The broadband diffractive lens or imaging element of claim 1 further comprising multiple pluralities of sectors or segments, each plurality having a different primary focal length from the other pluralities.

16. A broadband diffractive lens or imaging element, comprising a serial stack of minus filters, each minus filter of the stack having a diffractive geometry patterned thereon for focusing or imaging a different narrowband of radiation while passing all other wavelengths, all minus filters having substantially the same primary focal length.

17. The broadband diffractive lens or imaging element of claim 16 wherein the minus filters are phase minus filters.

18. The broadband diffractive lens or imaging element of claim 16 wherein the diffractive geometry is a Fresnel diffractive structure.

19. The broadband diffractive lens or imaging element of claim 16 wherein the diffractive geometry is selected from Fresnel zone plates, Fresnel phase plates, and blazed Fresnel phase plates.

20. The broadband diffractive lens or imaging element of claim 16 wherein the diffractive geometry is an amplitude modulation type diffractive element.

21. The broadband diffractive lens or imaging element of claim 16 wherein the diffractive geometry is a phase modulation type diffractive element.

22. The broadband diffractive lens or imaging element of claim 16 wherein the diffractive geometry is a holographic focusing or imaging pattern.

23. The broadband diffractive lens or imaging element of claim 16 wherein the serial stack of minus filters forms an intra-ocular or corneal lens.

24. The broadband diffractive lens or imaging element of claim 16 wherein the diffractive geometry is an element which focuses or images non-electromagnetic radiation selected from neutrons, electrons, atoms and ions.

25. The broadband diffractive lens or imaging element of claim 16 wherein the diffractive geometry is an element which focuses or images electromagnetic radiation selected from infrared, ultraviolet, deep ultraviolet, soft x-ray and hard x-ray wavelengths.

26. The broadband diffractive lens or imaging element of claim 16 wherein each minus filter of the stack is divided into a plurality of sectors or segments, each sector or segment in a filter having a different primary focal length.

* * * * *